Feb. 1, 1955  G. E. SORENSEN  2,700,825
CENTER DISTANCE DIRECT READING MEASURING INSTRUMENT
Filed May 21, 1948  4 Sheets-Sheet 4
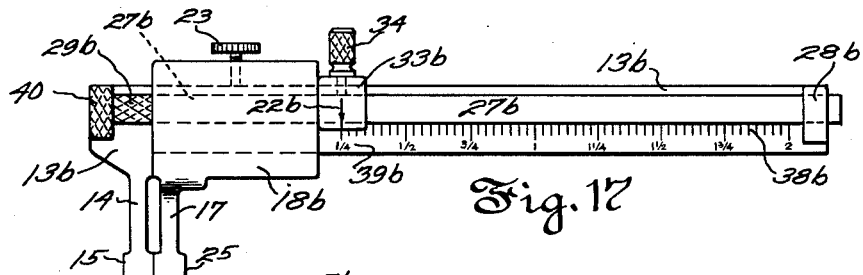
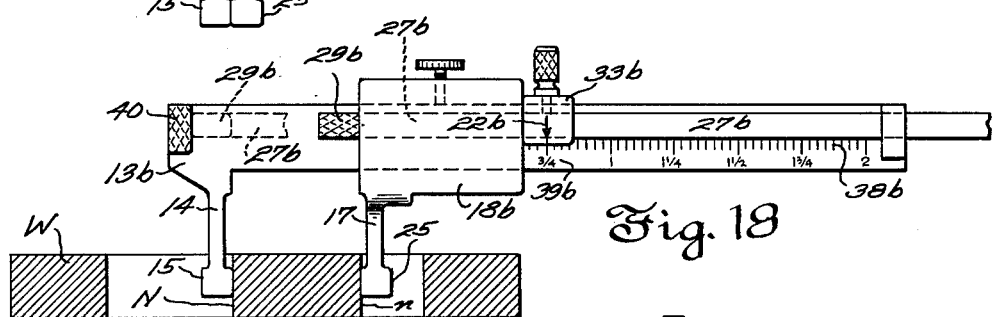
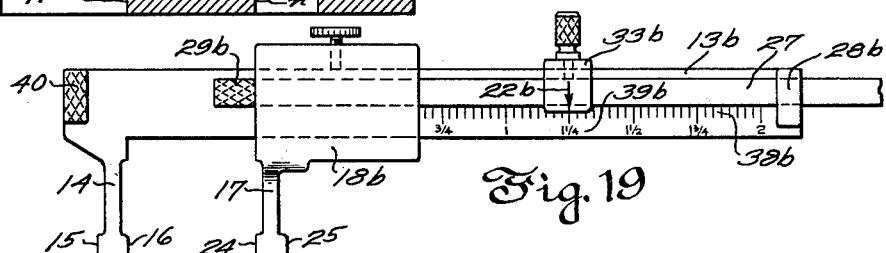
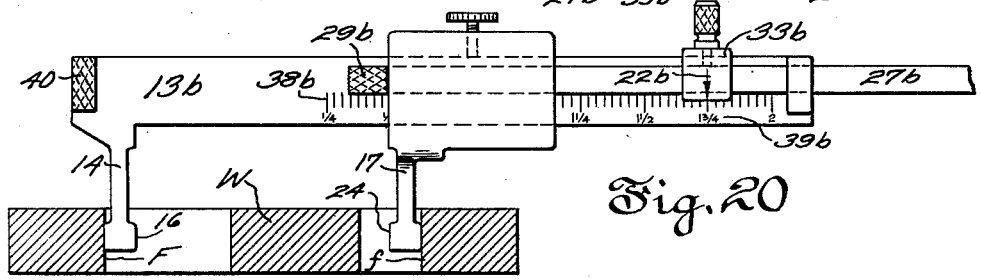
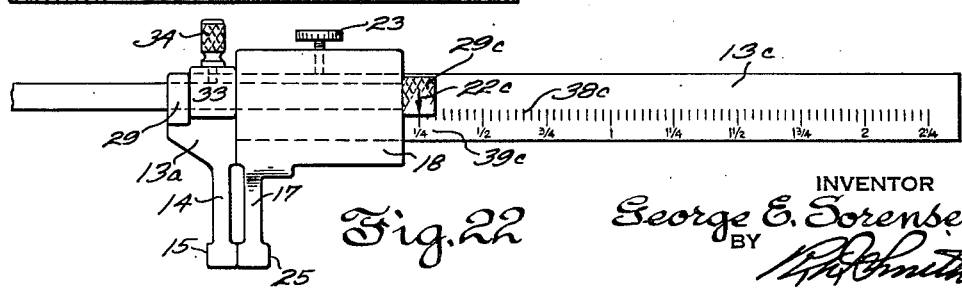
INVENTOR
George E. Sorensen,
BY
ATTORNEY United States Patent Office 2,700,825
Patented Feb. 1, 1955

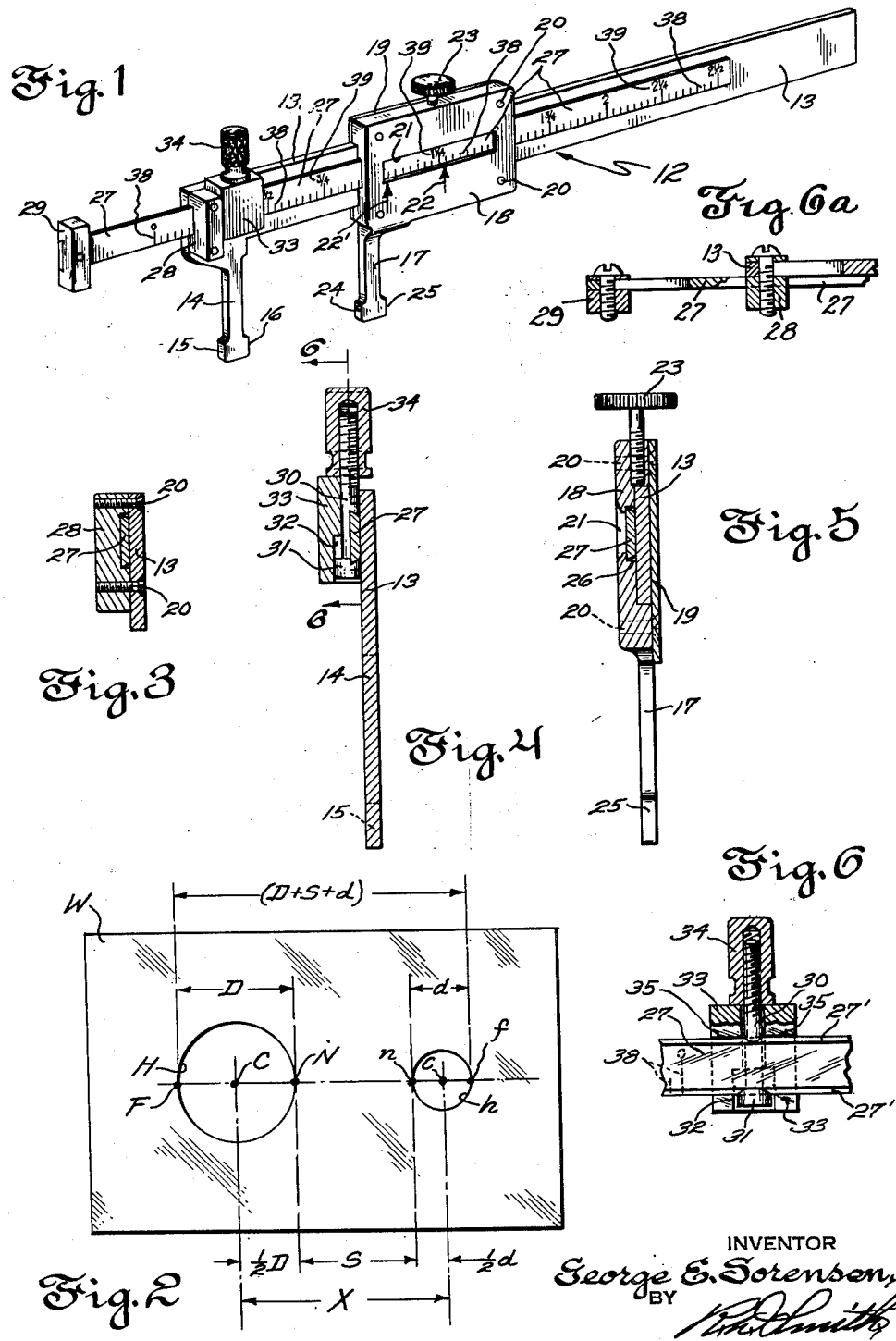

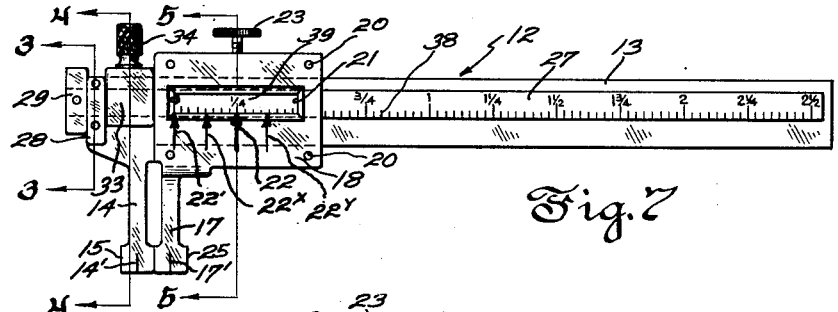
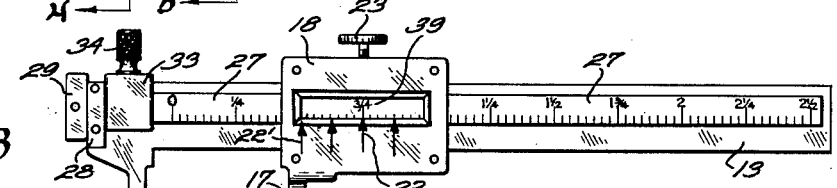
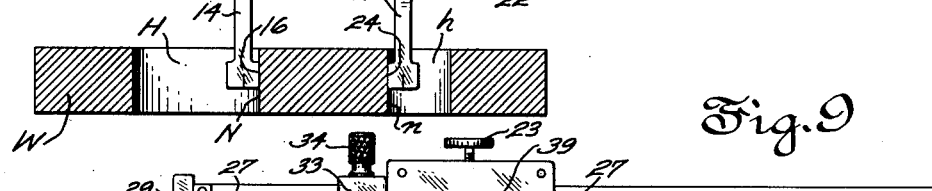
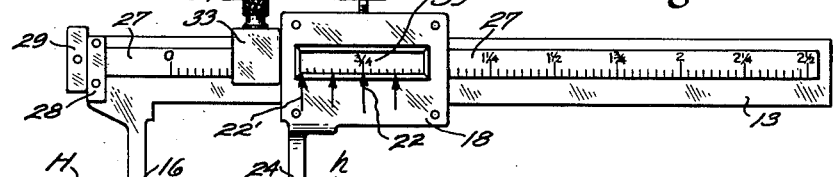
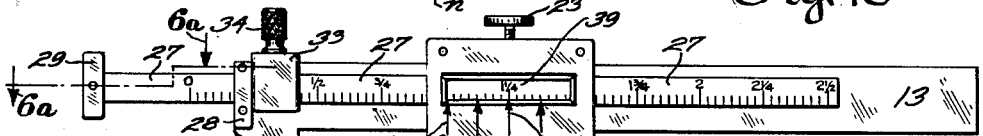

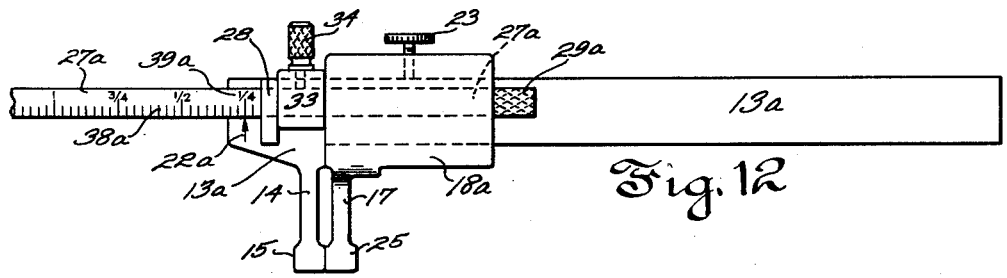
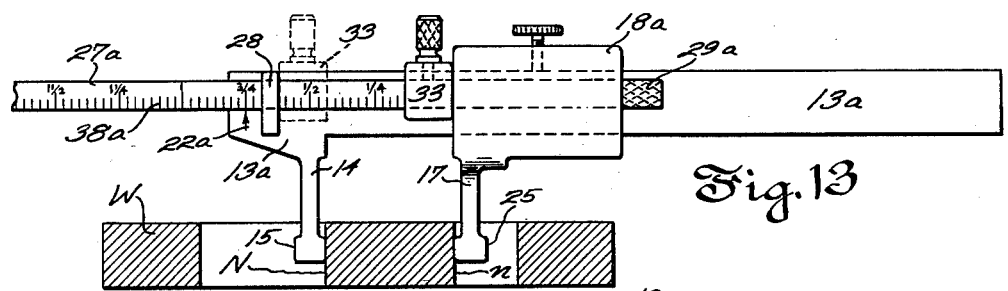
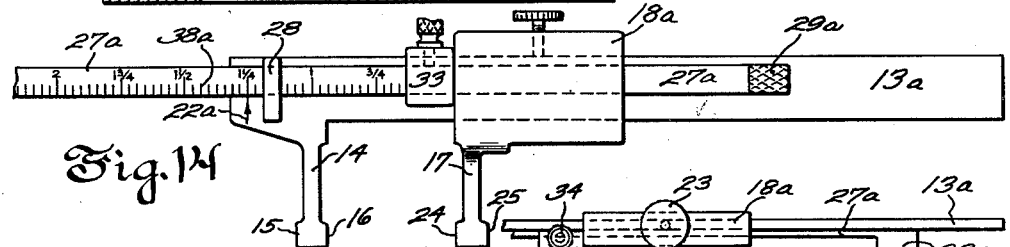
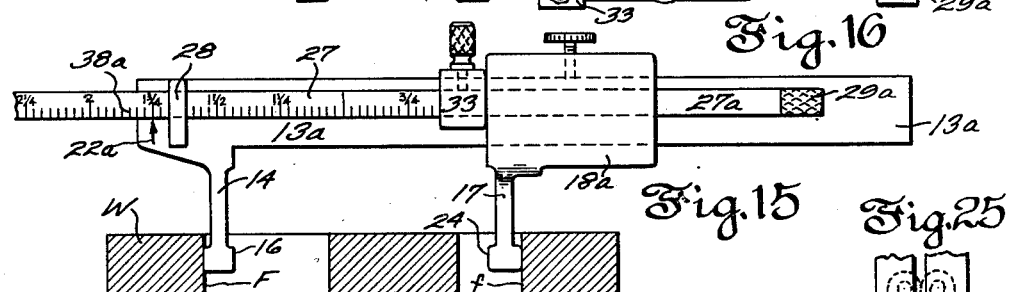
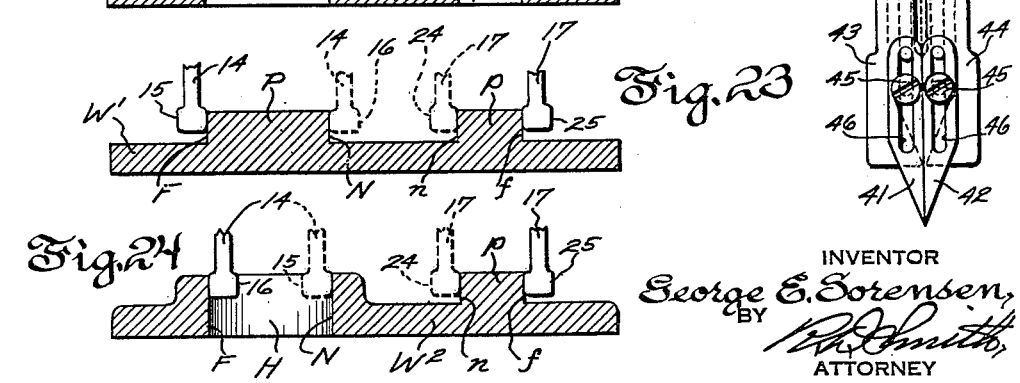

2,700,825

CENTER DISTANCE DIRECT READING MEASURING INSTRUMENT

George E. Sorensen, Fairfield, Conn.

Application May 21, 1948, Serial No. 28,368

15 Claims. (Cl. 33—143)

This invention relates to methods of and instruments for ascertaining by direct mutual registration of visible indicators and without mental computation the distance between two unmarked work loci lying respectively in spaces between different discernible marks that are serially spaced in separate pairs along the work, or for ascertaining the distance from a first unmarked or indiscernible locus lying in a space between two discernible marks, to a second locus which may comprise a third discernible mark located outside of said space.

An object of the present invention is by direct reading on a scale of graduations and without mental computation, to find the distance in units of linear measurement between any discernible mark or locus and some unmarked or indiscernible locus that lies, say, midway between two other discernible marks on a work piece or merely on a paper drawing. In machine shop practice the discernible locus may be the edge or shoulder of a block or other solid work piece or it may be merely a prick-punched spot or scratched-line mark thereon, while the indiscernible locus may be the unmarked center of a recess sunk into, or the unmarked center of a projection standing out from, the block whereupon the sides or shoulders of the recess or projection will constitute the discernible marks referred to.

The invention also affords ways and means for finding by direct reading on a scale of graduations, and without mental computation, the shortest or rectilinear distance between the unmarked centers or center lines of two side-by-side recesses, or the shortest distance between the unmarked centers or parallel center lines of two side-by-side projections, or the shortest distance between the unmarked center or center line of one recess and the unmarked center or center line of a neighboring projection, by merely calipering or spacing off by means of the work meeting or sensing points of my improved instrument a distance between parallel sides or shoulders of different recesses or projections in conjunction with calipering or spacing off a different distance between the other parallel sides or shoulders of such recesses or projections.

A particular object of the invention is to provide a sliding divider or calipers capable of affording direct reading of the distance between the centers of two circles whether the circumferences of such circles are touching or spaced apart. In three dimensional work the circles may be defined by the walls of cylindrical bore holes or by the peripheries of cylindrical pins.

It is a further object to provide the practical working mechanic with an improved sliding calipers affording direct reading of the rectilinear distance between the invisible axes or center points of neighboring holes, recesses, grooves, slots, projecting pins, ribs or the like on work pieces to be measured, by sensing with my improved calipers in pairs certain boundaries of such neighboring holes, recesses, grooves, slots, projecting pins, ribs or the like.

These and related objectives of the invention will be understood in greater detail from the following description of successful embodiments of the invention, in which description reference is made to the accompanying drawings forming a part hereof wherein:

Fig. 1 is a perspective view of a direct reading, dimension finding instrument in the form of a sliding calipers characterized by the present improvements and helpful in performing certain novel measuring methods embodying the invention.

Fig. 2 shows a work piece in which the spacing of indiscernible points, such as hole centers, is determinable by direct reading on the instrument of Fig. 1 without mental computation by steps of measurement performed in accordance with the novel principles of this invention.

Figs. 3, 4 and 5 are enlarged views taken in section on the respective planes 3—3, 4—4 and 5—5 in Fig. 7 looking in the direction of the arrows.

Fig. 6 is a view taken in section on the plane 6—6 in Fig. 4 looking in the direction of the arrows.

Fig. 6a is a fragmentary plan view taken in section on the planes 6a—6a in Fig. 10 showing a modification of details of the construction.

Figs. 7 to 11, inclusive, show movable parts of the instrument of Fig. 1 shifted successively into different relationships one to another and in respect to the work piece of Fig. 2 in the course of performing a measurement between hole centers in the latter.

Figs. 12 to 15 show a modified form of instrument incorporating the invention with its parts shifted successively into different relationships corresponding to Figs. 7, 8, 10 and 11 respectively, for performing the same measurement of work.

Fig. 16 is a fragmentary plan view looking downward on Fig. 15.

Figs. 17 to 20 show a further modified form of instrument incorporating the invention with its parts shifted successively into different relationships corresponding to Figs. 7, 8, 10 and 11, respectively, for performing the same measurement of work.

Fig. 21 is a plan view looking downward on Fig. 20.

Fig. 22 shows a still further modified construction of instrument embodying the invention and capable of use according to the principles illustrated in Figs. 17 to 21.

Fig. 23 shows projections instead of holes being measured by any form of the instrument herein disclosed.

Fig. 24 shows one hole and one projection being likewise measured.

Fig. 25 shows a modified construction of the jaws of the instrument equipped respectively with projections each of which has a single work meeting point.

Fig. 2 demonstrates a practical shop problem in ascertaining distances between unmarked work loci such as hole centers, that will be indicated as a direct reading of linear measurement by a dividers or calipers constructed and used according to this invention. In the work piece W, there are circles which may be the circumferences of cylindrical holes H and h having different diameters D and d, respectively. The nearest together points N and n on these circles are separated by the rectilinear distance S. In practice the centers C and c of holes H and h, respectively, are unmarked work loci or indiscernible points. However, it is known that in a common straight line passing through centers C and c, the center C is a distance of ½D from the circumference of hole H, and the center c is a distance of ½d from the circumference of hole h. Therefore the rectilinear distance X between center C and center c is (S+½D+½d) which may be expressed as:

$$X \text{ equals } S + \frac{D+d}{2}$$

Without the present improvements and on the scale of an ordinary sliding calipers, which is usually marked on the frame thereof, we might space off and read directly the aggregate value of (D plus S plus d) by calipering the farthest apart discernible points F and f on the circumferences of the two holes, and record that measurement. We then might space off the distance S alone by calipering the nearest together discernible points N and n on the circumferences of the two holes, and record that measurement. We then might compute mentally the center distance X by subtracting the second instrument indicated measurement S from the first instrument indicated aggregate distance (D plus S plus d), divide the remainder by "2" and then add back the value S. The mathematical result would be the distance X between the two indiscernible points C and c which it is desired to know.

By means of an instrument incorporating the present invention used as herein newly devised, it becomes possible to effect a direct reading of the distance X upon the scale of the instrument itself. One of many possible forms such an instrument may take is designated 12 in its entirety in Fig. 1.

In common with conventional sliding calipers, the improved instrument 12 comprises a bar-like rigid frame 13 having a fixed jaw or extension 14 presenting a first or stationary pair of work meeting or sensing terminals 15 and 16 spaced apart by the width of jaw 14 in a direction parallel with the longitudinal extent of frame 13.

A companion jaw 17 is rigid with the member 18 herein comprising a scale sighting box retained on frame 13 in freely sliding relation thereto. The rear wall of box 18 is formed by a back plate 19 that is removably united with the front portion of the box by screws 20 or other suitable means. The front wall of box 18 contains an elongated sight aperture or window 21 at whose border is marked the measurement reading index 22. A thumb screw 23 has threaded engagement edgewise through box 18 and can be set up tightly against the top edge of frame 13 as shown in Fig. 5 to fasten box 18 in any desired set position along frame 13. Jaw or extension 17 of box member 18 provides a second or movable pair of work meeting or sensing terminals 24, 25 spaced apart by the constant width of jaw 17 and aligned with terminals 15 and 16 in a path parallel with the direction of separating movement of jaws 14 and 17.

Groove 26 in box 18 accommodates a scale slide 27 which is free to be moved lengthwise of frame 13 and relatively to box 18. Slide 27 further has a free fit in a slide bearing 28 that is fixed on frame 13. Slide 27 can conveniently be pushed or pulled lengthwise through bearing 28 as well as through the box 18 by means of its T-handle 29 fixed thereon which comprises part of certain stop means hereinafter referred to and acts to resist movement of slide 27 toward the right relative to frame 13 in the predetermined or starting position of the former relative to the latter shown in Figs. 7, 8 and 9.

Scale slide 27 carries a further part of the aforementioned stop means in the form of a shiftable stop or check 33 that is grooved horizontally to fit slide 27 and that can be made fast or loose thereon by means of a clamp bolt 30 having the head 31 occupying a vertical clearance hole through the stop. A dovetail groove cut transversely in bolt 30 accommodates the beveled edges 27' of slide 27. The top edge of stop 33 is somewhat above the top edge of frame 13 so that stop 33 alone takes the thrust of a thumb nut 34 which may be tightened or loosened on the threads of clamp bolt 30. Tightening thumb nut 34 forces slide 27 upward so that its top edge becomes clamped against the top shoulders 35 of the groove for slide 27 in stop 33 as shown in Fig. 6. This makes the stop fast to the slide.

On slide 27 there is a scale of graduations 38 marked with indicia 39 which denote halves of the true rectilinear separating movement of jaws 14 and 17. In other words the graduation on scale 38 which is spaced one inch from the zero mark of the scale carries the indicium ½ inch, the graduation mark which is two inches from this same zero mark carries the indicium reading 1 inch, etc. In the closed-together position of parts in Fig. 7, indicium ¼ inch is seen to register with index 22. In the particular instrument shown, this indicium ¼, instead of zero, is made the graduation with which index 22 initially registers in order to compensate for a constant which is one half the used width of jaws 14 and 17 combined. In other words this constant, ¼, is the spacing between medial point 14' and medial point 17' in the widths of jaws 14 and 17 respectively when terminals 16, 24 are mutually touching as viewed in Fig. 7.

The constant referred to will be one half the used widths of jaws 14 and 17 combined regardless of the dimension of either jaw individually and regardless of whether the widths of both jaws are alike. If the width of neither of jaws 14 and 17 is made use of in the measuring operation as in Fig. 25, the case with an instrument of the divider type having divider legs each of which is slender and tapers to a single work meeting point, then the differently positioned index mark 22' is provided on box member 18 to be read against the scale 38. Here in the starting position of parts shown in Fig. 7 the reading of index 22' will be "zero," instead of ¼, on the scale. If one of jaws 14 or 17, alone, were pointed and possessed no used width at its work meeting terminal, while the other jaw did possess the used width of ¼" shown in Fig. 7, then a still differently positioned index 22x must be used resulting in an initial reading of ⅛" on scale 38. This still, however, is half the width of jaws 14 and 17 combined where the total used width is the width of but a single one of the jaws.

In one practical example of use, the following values will be assumed for the dimensions of work piece W of Fig. 2: $S=1''$, $D=1''$, $d=½''$ and $X=1¾''$. Use of the instrument 12 may be started with its sight box 18 loose on frame 13 and its stop 33 loose on slide 27 and slide handle 29 in abutting contact with frame bearing 28. Also stop 33 is in abutting contact with both frame bearing 28 and box member 18. At this time work meeting terminals 16 and 24 are closed together in mutually touching contact.

To perform its measuring operation my improved instrument of Figs. 1 to 11 is operated by changing the setting of its parts in what may be referred to as three stages, which stages may be performed in variable sequence with the same ultimate result.

In one possible sequence of the said three stages of setting, the terminals 16 and 24 may first be placed in register respectively with the nearest together points N and n, of the holes H and h, so that said terminals become separated to the extent of the rectilinear distance S as in Fig. 8. This separates box member 18 from stop 33 a like distance which, however, is falsely or fictitiously indicated or denominated as the idle dimensional magnitude ¾" in Fig. 8. This idle reading of ¾" may be mentally ignored, but is a function of the true distance 1" that jaws 14, 17 have actually been moved apart in the sense that it is half of said true distance, plus the before explained constant ¼". Box member 18 will now be fastened to frame 13 by tightening thumb screw 23. Scale slide 27 remains free to be shifted lengthwise toward the left in relation both to frame 13 and to member 18 which carries index 22. This completes the initial stage of setting.

Next the idle existing reading of the above explained function of S will be modified mechanically without mental attention or need of observing the indicia on scale 39 as follows. First the stop or signal 33 is shifted from its position in Fig. 8 into abutting contact with box member 18, while the latter remains fast to frame 13 in its position shown in Fig. 9. Here the stop 33 will be fastened to the scale slide 27 by tightening thumb nut 34. Now by means of T-handle 29, scale slide 27, in unison with stop 33, will be pulled toward the left relatively both to frame 13 and to sight box 18 until stop 33 abuts again with frame bearing 28. The extent of this mechanically determined movement of slide 27 is thus governed and limited by stop 33 so that it exactly duplicates the extent of previous separation of terminals 16 and 24 in Figs. 8, 9 and 10. Hence the initial relative movement between index 22 and scale slide 27 becomes doubled by mechanism operatively associating slide 27 with both frame 13 and box member 18 and without resort to mental computation or need to observe the measurement indicating readings of the instrument up to this point. Index 22 is seen to register with indicium 1¼" in Fig. 10, which is an intermediate reading that may be ignored. This completes the intermediate stage of setting.

Now thumb screw 23 is loosened, and while stop 33 is kept in abutting contact with frame bearing 28, box member 18 is pulled farther to the right on frame 13 for further separating jaws 14, 17 until the work meeting terminals 15 and 25 sense the farthest apart discernible points F and f. This completes the final stage of setting. When this is done the true distance 1¾" between hole centers or unmarked loci C and c is correctly indicated by index 22 against scale 38, this being the objective of the measuring operation.

With the aid of the instrument described in the foregoing there can thus be practiced a new method of ascertaining without mental computation a distance S between two unmarked loci D and d lying respectively in spaces, between different pairs of serially spaced discernible marks F, N and n, f.

The operation illustrated in Figs. 9 and 10 represents the method step of converting the idle or fictitious reading of ¾" in Fig. 8 into a corrected or intermediate reading 1¼" which is the true measure of the distance between N and n plus the constant ¼".

The following chart makes clear that the initial and final settings of the instrument may be interchanged. In other words the farthest apart points F, f may be calipered first and the nearest together points N, n may be calipered last. The chart traces the comparative relationship of instrument setting and instrument readings corresponding to the dimensions of the work piece W being measured where in the measuring operation there comes into play a used width of one or both of the jaws 14, 17.

| | | |
|---|---|---|
| Initial spacing of medial jaw points 14', 17'. Corresponding reading by half-size calibrated indicia (ignored). | ¼"=one half combined widths of jaws. ¼" (constant) | |
| | *Calipering nearest together points first.* | *Calipering farthest apart points first.* |
| Initial Stage of Setting: True extent of initial movement of jaws to first setting. | 1"=S | 2"=Sum of D plus S plus d minus combined widths of jaws. |
| Corresponding fictitious reading on half-size calibrated indicia (ignored). | ¾"=the constant ¼" plus half the actual extent of initial jaw movement. | 1¼"=the constant ¼" plus half the actual extent of initial jaw movement. |
| Intermediate stage of setting: Extent of corrective movement between scale and index to compensate for half-size calibrated indicia. | 1"=duplicate of extent of initial jaw movement. | 2"=duplicate of extent of initial jaw movement. |
| Resultant corrected intermediate reading on half-size calibrated indicia. | 1¾"=the constant ¼" plus true extent of initial jaw movement. | 2¼"=the constant ¼" plus true extent of initial jaw movement. |
| Final stage of setting: True increment of final movement of jaws to ultimate setting. | 1"=increase in spread of jaws (Sum of D plus d minus combined widths of jaws). | 1"=decrease in spread of jaws (Sum of D plus d minus combined widths of jaws). |
| Ultimate direct reading of center distance X on half-size calibrated indicia = the intermediate reading altered by half the true increment of final jaw movement. | 1¾" | |

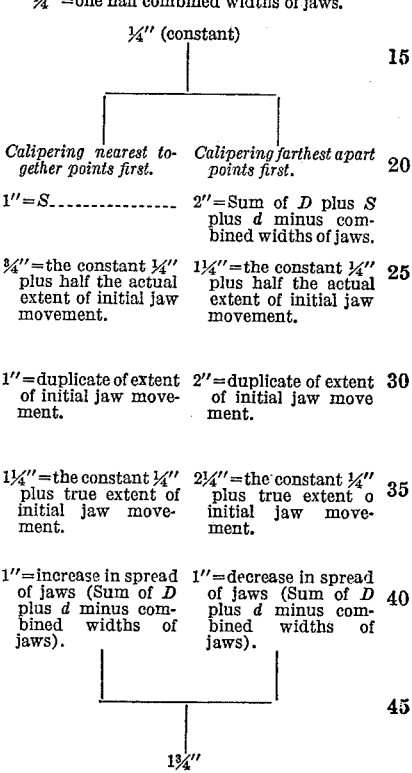

If jaws having no used width as hereinbefore referred to are employed and the index 22' is used in reading the instrument, the constant ¼" will be eliminated and the comparative relationship of instrument setting and instrument readings will differ as follows from the foregoing chart.

| | | |
|---|---|---|
| Initial spacing of medial jaw points 14', 17'. Corresponding reading by half-size calibrated indicia. | Zero Zero | |
| | *Calipering nearest together points first.* | *Calipering farthest apart points first.* |
| Initial stage of setting: True extent of initial movement of jaws to first setting. | 1"=S | 2½"=Sum of D plus S plus d. |
| Corresponding fictitious reading on half-size calibrated indicia (ignored). | ½"=half the true extent of initial jaw movement. | 1¼"=half the true extent of initial jaw movement. |
| Intermediate stage of setting: Extent of corrective movement between scale and index to compensate for half-size calibrated indicia. | 1"=duplicate of extent of initial jaw movement. | 2½"=duplicate of extent of initial jaw movement. |
| Resultant corrected intermediate reading on half-size calibrated indicia. | 1"=true extent of initial jaw movement. | 2½"=true extent of initial jaw movement. |
| Final stage of setting: True increment of final movement of jaws to ultimate setting. | 1½"=increase in spread of jaws (Sum of D plus d). | 1½"=decrease in spread of jaws (Sum of D plus d). |
| Ultimate direct reading of center distance X on half-size calibrated indicia=the intermediate reading altered by half the true increment of final jaw movement. | 1¾" | |

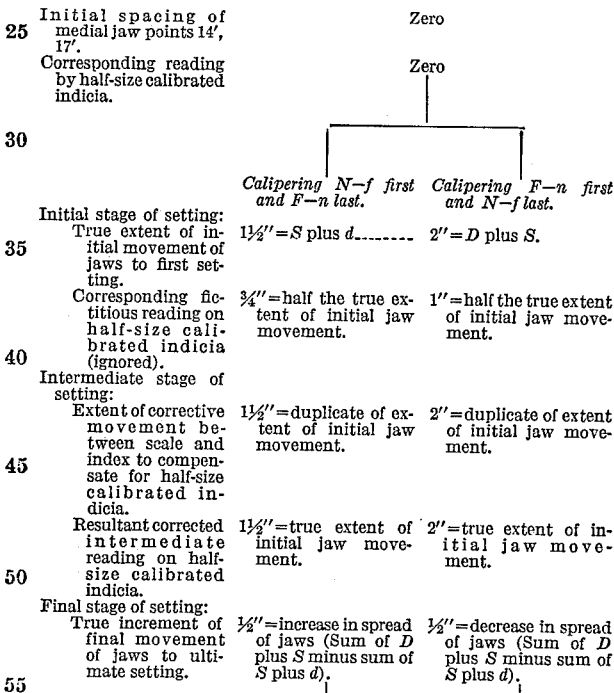

Whether jaws having no used width are employed as in the immediately foregoing table or jaws are employed having a constant combined width as in the first recited table, there are also possible two other sequences of the three measuring steps which will give an equivalent ultimate result as is evidenced by the chart that follows. For simplicity it is here assumed that the jaws possess single points, i. e. have no used width, wherefore index 22' may be used registering "zero" in the starting position of parts.

| | | |
|---|---|---|
| Initial spacing of medial jaw points 14', 17'. Corresponding reading by half-size calibrated indicia. | Zero Zero | |
| | *Calipering N−f first and F−n last.* | *Calipering F−n first and N−f last.* |
| Initial stage of setting: True extent of initial movement of jaws to first setting. | 1½"=S plus d | 2"=D plus S. |
| Corresponding fictitious reading on half-size calibrated indicia (ignored). | ¾"=half the true extent of initial jaw movement. | 1"=half the true extent of initial jaw movement. |
| Intermediate stage of setting: Extent of corrective movement between scale and index to compensate for half-size calibrated indicia. | 1½"=duplicate of extent of initial jaw movement. | 2"=duplicate of extent of initial jaw movement. |
| Resultant corrected intermediate reading on half-size calibrated indicia. | 1½"=true extent of initial jaw movement. | 2"=true extent of initial jaw movement. |
| Final stage of setting: True increment of final movement of jaws to ultimate setting. | ½"=increase in spread of jaws (Sum of D plus S minus sum of S plus d). | ½"=decrease in spread of jaws (Sum of D plus S minus sum of S plus d). |
| Ultimate direct reading of center distance X on half-size calibrated indicia = the intermediate reading altered by half the true increment of final jaw movement. | 1¾" | |

A comparison of the above charts and of the two columns in each chart makes clear the following principles on which this invention is based.

Where either or both work sensing jaws possess a dimension of width which comes into play in sensing the work the index to be used is that which originally will, in starting position, register on the scale with a graduation spaced from zero a distance equal to the true combined widths of the jaws. But this will result in a reading on the scale of one half the true combined widths of the jaws because of the half-size calibration of the indicia. This reading is termed a "constant" in the charts because its effect is present throughout the three stages of setting and leaves the ultimate direct reading of center distance purely a function of the movements of the sensing jaws in measuring the work uninterfered with by the presence of this "constant."

Although we desire to have the final stage of jaw setting alter the intermediate reading only half the actual increase or decrease in spread of work sensing jaws in that stage of setting for the purpose of indicating a distance between indiscernible centers that lie midway the actually calipered marks, we find that this characteristic of half-value reading comes also into play but unwanted when we caliper and wish the instrument to register the true distances between the discernible marks. The half-value reading in the initial stage of setting therefore constitutes a fictitious reading that needs correction. This correction is accomplished, in forms of the invention herein disclosed in the intermediate stage of corrective setting, by manipulating stop 33 and slide 27 as shown in Figs. 9 and 10. There are other ways to accomplish this correction of fictitious reading by manipulation of the instrument without mental computation as is hereinafter described.

In certain claims appended hereto I refer to the above mentioned fictitious reading as an idle dimensional magnitude comprising a function of the dimensional setting of the jaws 14, 17 in the initial stage of the instrument setting, and I refer to the ultimately registered value of the center distances as a readable value differing from said idle magnitude to the extent of a function of the increment of relative movement of the jaws 14, 17 in the last stage of the instrument setting. These functions in the herein disclosed forms of the invention have proportional equality, each being in the ratio of one to two as a matter of relationship of the readings to the actual extents of movements of the work sensing jaws.

A structural modification is shown in Figs. 12 to 16, inclusive, wherein the instrument is assumed to be constructed in minor details as illustrated in Figs. 3 to 6, inclusive. However, the sight aperture or measurement reading window is omitted from box member 18a and the slide 27a carries its handle 29a differently arranged thereon, in this case serving as a part of the stop means for slide 27a by engaging with the right edge of box member 18a instead of with frame bearing 28. Slide 27a is provided with a scale of graduations 38a progressing numerically from right to left, instead of from left to right, marked with indicia 39a which as in Figs. 7 to 11 denote one half the actual spacing apart of the graduations. In this form of the invention the index 22a is carried on an extended left end portion of frame 13a. The stop 33 rides on and is shiftable relatively to slide 27a between member 18a and the frame bearing 28 the same as in Figs. 1 to 11, inclusive. Also this stop is releasably fastened to the slide by means of the same kind of thumb screw 34 while box member 18a is releasably fastened to the frame 13a by the same kind of thumb screw 23.

Explaining the method of using the modified form of instrument in Figs. 12 to 16 for performing a measuring operation similar to that in Figs. 1 to 11, the parts may initially occupy their positions shown in Fig. 12 with box member 18a loose on frame 13a and stop 33 loose on slide 27a. At this time stop 33 is sandwiched between and in contact both with member 18a and with frame bearing 28. Slide handle 29a is in contact with box member 18a. The work meeting terminals 16 and 24 are in contact and index 22a registers with the graduation denoted ¼ inch on scale 38a. Terminals 16, 24 are first separated as shown in Fig. 13 until they register respectively with the nearest together work points N and n. Stop 33 may ride with slide 27a into its full line position shown in Fig. 13 but can be shifted back to its broken line position shown in that figure and thereat fastened to slide 27a. Slide 27a with stop 33 thus fixed thereto is next drawn toward the right to its position shown in Fig. 14 where stop 33 contacts with member 18a. Now index 22a will be found to register with graduation 1¼" on scale 38a. Then when member 18a, stop 33 and slide 27a are moved in unison farther to the right to their positions relative to frame 13a shown in Fig. 15 where the work sensing terminals 15, 25 are in register with the farthest apart discernible marks F and f, the graduation 1¾" will be brought into register with index 22a giving this direct and true reading of the distance X between the unmarked loci C and c as in Fig. 11, which is the objective of the measurement.

In the further modified construction of Figs. 17 to 21, the frame 13b carries a stop 40 at its left end engageable by the head 29b of the slide 27b which head serves both as a handle for the slide and as a fixed part of the stop means on the slide. Here the slide bearing 28b of the frame 13b is transferred to the right end of the frame and the scale of graduations 38b is carried on frame 13b instead of on the slide. The movable part of the stop means, namely stop 33b, carries the index 22b always in register with scale 38b. In other respects the construction of the instrument in Figs. 17 to 21 may be like that shown in Figs. 1 to 15.

In using the instrument of Figs. 17 to 21, the slide head 29b in Fig. 17 is seen initially to just fill the space between member 18b and the frame stop 40 when work sensing terminals 16 and 24 are in contact. At this time index 22b on stop 33b registers with the graduation ¼". When jaws 14 and 17 are separated into register with the nearest together discernible marks N and n, the slide 27b may or need not move to its full line position shown in Fig. 18 but if it does so move the member 18b will first be fastened to frame 13b and slide head 29b will then be pulled toward the left to its broken line position in Fig. 18 where it contacts with frame stop 40. At this time stop 33b will be fixed to slide 27b by tightening thumb screw 34 so that when thumb screw 23 is loosened, permitting member 18b to move farther toward the right, the slide 27b and stop 33b will move in unison with it until the work sensing terminals 15, 25 are in register with the farthest apart discernible marks F, f. Now index 22b will register with graduation 1¾" indicating as before the true distance X between the hole centers C and c.

Fig. 22 illustrates still another variation of the many possible forms my invention may take in which, as in Figs. 17 to 21, the frame 13c carries the scale of graduations 38c and the index 22c is carried by the head 29c of slide 27c. The manner of using this form of the instrument will be apparent from the foregoing description of other forms of the invention.

Fig. 23 shows a different shape of work piece in which there are projections P, p in place of holes H, h to be measured by the method and with the assistance of an instrument embodying the invention. Here it will be noticed that the constant ¼" of the charts explained in the foregoing will likewise be effective throughout all three stages of the setting of the instrument and therefore index 22 should be used for all readings.

In Fig. 24 terminals 16 and 25 cooperate simultaneously in sensing the nearest together boundaries N, n of hole H and projection P while terminals 15 and 24 cooperate simultaneously in sensing the farthest apart boundaries F, f of hole H and projection p.

In order to give a freely selective choice as to whether the width of either, or of neither, or of both jaws shall be used as a factor in the measuring operation there is shown in Fig. 25 one example of single pointed terminals 41 and 42 with which jaws 43 and 44 may be equipped respectively. Either of the work meeting points 41 or 42 may optionally be extended downward or retracted upward with respect to the jaw by which it is carried and is fastened in selected position by a shouldered screw 45 which passes through elongated slot 46 in the terminal and has threaded engagement with jaw 43 or 44. The head of screw 45 clamps the terminal in broadside relation fixedly against the jaw when the screw is tightened thus making the terminal rigid with the jaw in either projected or retracted position. The retracted position is indicated in broken lines. The pointed ends of each of terminals 41 or 42 when projected may serve as the pointed work meeting ends of the legs of a beam type of dividers when projected from the jaw 43 or 44. The construction shown in Fig. 25 is suitable for use with the "zero" index 22' by following the sequence of operations set forth in either of the last two of the three charts appearing hereinbefore.

In place of marking plural indexes such as 22' and 22x on the box member 18, or in conjunction with index 22a on frame 13a in Fig. 12, or in conjunction with index 22b on stop 33b in Fig. 17, or in conjunction with index 22c on slide head 29c in Fig. 22, I may arrange slide head or handle 29, 29a, 29b or 29c to clamp in different positions on and lengthwise of its slide to accord with different combined widths of the instrument jaws. Or for the same purpose I may make the frame bearing abutments 28, 28b or 40 shiftably adjustable on and lengthwise of the instrument frame. See Fig. 6a.

From the foregoing there will be self-evident the manner of manipulating my improved instrument for obtaining a direct reading of the distance between a first unmarked locus, such as C, lying in a space between a pair of spaced discernible points, such as F, N, and a second locus, such as n, that is discernible and located outside of said space. In this case index 22x will be used because the width of only the jaw 14 will become a factor in the measuring operation. A constant of ⅛" will therefore be involved in all measurement readings on the instrument.

As an example of this type of measuring operation, the work meeting surfaces 16 and 24 of the mark-sensing elements 14 and 17 may first be set in measuring accord with the spacing of locus n from the nearest one N of the discernible marks. Thereupon index 22x will register ⅝" on scale 38 or half the initial 1" actual spreading movement of the jaws plus the constant ⅛". This 1" extent of initial jaw separation will next be mechanically doubled by the kind of corrective operation portrayed in Figs. 9 and 10 so that the intermediate reading becomes 1⅛". The work sensing elements 14 and 17 will then be further separated by an increment of distance to bring work meeting surfaces 15 and 24 into measuring accord with the spacing of F from n. This increment of movement equals D minus the width of jaw 14 or 1" minus ¼" or ¾" final increment of jaw movement. Thereupon the intermediate reading becomes modified to the extent of a certain function or one-half of the final ¾" increment of jaw movement so that the final reading becomes the intermediate reading of 1⅛"+⅜"=1½", the true distance between C and n.

Special problems of work measurement may call for an even different location of the index than is designated by positions 22, 22' or 22x in Fig. 7. An example is if it were desired to measure and indicate directly on the instrument the distance from point (f) to point (c) by use of the instrument shown in Fig. 7. Such measuring operation calls for no use of work meeting terminal 24 but prohibits the only used terminal 25 on jaw 17 from starting in contact with the used terminal 16. In other words the width of jaw 17 does not come into play during the calipering of the discernible marks n—N and n—F but does enforce initial spacing of the used work meeting terminals in Fig. 7 which necessitates the use of a still differently positioned index 22y whose correct location in the starting condition of parts in Fig. 7 will be a position of register with a graduation marked with indicium ⅜" on scale 38.

With whatever index mark is chosen and regardless of the numerical system of indicia that may be used in the calibration of the scale, the several variations of sequence herein taught in which the parts of the instrument may be manipulated and in which the instrument may be brought into meeting relation to the work are equally possible, wherefore the appended claims will be understood as directed to and intended to cover all workable combinations and sequences of the method steps taught herein as well as obvious substitutes for the shapes and relationships of the structural elements of the instrument itself.

I claim:

1. The method of ascertaining without mental computation the distance between two unmarked loci lying respectively and centrally in spaces between discernible marks of separated different pairs of said marks arranged in series in a straight line connecting said loci, which includes the steps of, setting two mark-sensing elements in measuring accord with the true space distance separating the innermost marks of said series, shifting an indicator along a scale of spaced graduations falsely denominated as half values of the aggregates of their spacings an increment of movement equal to said true space distance but falsely indicated by said scale, recording said increment of movement by placing a signal in relation to said scale in a way to enable said increment to be discerned and made use of without reference to the graduations of said scale, relatively moving said indicator and scale an extent determined by reference to said signal without reference to said graduations thereby without mental computation to convert a falsely denominated reading of said increment on said scale to a true reading thereof, placing said two mark-sensing elements in measuring accord with the overall distance of separation of the outermost marks of said series, and relatively moving said indicator and scale an extent equal to the difference between said overall distance and said space distance, whereupon there is indicated on said scale by said indicator the true spacing of said loci consisting of the true measure of said space distance plus a half measure of the differences between said overall distance and said space distance, said step of setting said elements in accord with said innermost marks and the corresponding shifting of the indicator being sequentially irrespective of said step of placing said elements in accord with said outermost marks and the corresponding relative moving of said indicator and scale.

2. The method of ascertaining without mental computation the distance between two unmarked loci lying respectively midway of spaces between discernible marks of separated different pairs of said marks arranged in series in a straight line connecting said loci, which includes the steps of, setting two mark-sensing elements in measuring accord with the true space distance separating the innermost marks of said series, shifting an indicator along a scale of spaced graduations falsely denominated as half values of the aggregates of their spacings an increment of movement equal to said true space distance but falsely indicated as a half-value reading by said scale, recording said increment of movement by placing a signal in relation to said scale in a way to enable said increment to be discerned and made use of without reference to the graduations of said scale, relatively moving said indicator and scale an extent equal to said increment by reference to said signal without reference to said graduations thereby without mental computation to convert said half-value reading of said increment on said scale to a full value reading of said space distance, placing said two mark-sensing elements in measuring accord with the overall distance of separation of the outermost marks of said series, and relatively moving said indicator and scale an extent equal to the difference between said overall distance and said space distance, whereupon there is indicated on said scale by said indicator the true spacing of said loci consisting of the true measure of said space distance plus a half measure of said difference, said step of setting said elements in accord with said innermost marks and the corresponding shifting of the indicator being sequentially irrespective of said step of placing said elements in accord with said outermost marks and the corresponding relative moving of said indicator and scale.

3. The method of ascertaining without mental computation the distance between two unmarked loci lying respectively and centrally in spaces between discernible marks of separated different pairs of said marks arranged in series in a straight line connecting said loci, which includes the steps of, setting two mark-sensing elements at least one of which possesses width in measuring accord with the true space distance separating the innermost marks of said series, shifting an indicator along a scale of spaced graduations falsely denominated as half values of the aggregates of their spacings an increment of movement equal to said true space distance modified by at least a portion of said width but falsely indicated by said scale, marking off said increment of movement by placing a signal in relation to said scale in a way to enable said increment to be discerned and made use of without reference to the graduations of said scale, relatively moving said indicator and scale an extent determined by reference to said signal without reference to said graduations thereby without mental computation to convert a falsely denominated reading of said increment on said scale to a true reading thereof, placing said two mark-sensing elements in measuring accord with the overall distance of separation of the outermost marks of said series modified by said portion of said width, and relatively moving said indicator and scale an extent equal to the difference between said modified overall distance and said modified space distance, whereupon there is indicated on said scale by said indicator the true spacing of said loci consisting of the true measure of said space distance plus a half measure of the difference between said overall distance and said space distance, said step of setting said elements in accord with said innermost marks and the corresponding shifting of the indicator being sequentially irrespective of said step of placing said elements in accord with said outermost marks and the corresponding relative moving of said indicator and scale.

4. The method of ascertaining without mental computation the distance between a first unmarked locus lying centrally in a space between a pair of spaced discernible marks, and a second discernible locus located outside of said space, which includes the steps of, setting two mark-sensing elements in measuring accord with the true space distance separating said second locus from the nearest one of said discernible marks, shifting an indicator along a scale of spaced graduations falsely denominated as half values of the aggregates of their spacings an increment of movement equal to said true space distance but falsely indicated by said scale, recording said increment of movement by placing a signal in relation to said scale in a way to enable said increment to be discerned and made use of without reference to the graduations of said scale, relatively moving said indicator and scale an extent determined by reference to said signal without reference to said graduations thereby without mental computation to convert a falsely denominated reading of said increment on said scale to a true reading thereof, placing said two mark-sensing elements in measuring accord with the overall distance of separation of said second locus from the farthest one of said discernible marks, and relatively moving said indicator and scale an extent equal to the difference between said overall distance and said space distance, whereupon there is indicated on said scale by said indicator the true spacing of said loci consisting of the true measure of said space distance plus a half measure of the difference between said overall distance and said space distance.

5. The method of ascertaining without mental computation the distance between two unmarked loci lying respectively and centrally in spaces between discernible marks of separated different pairs of said marks arranged in series in a straight line connecting said loci, which includes the steps of, setting two mark-sensing elements in measuring accord with a first distance separating two marks each in a different one of said pairs, shifting an indicator along a scale of graduations falsely denominated as half values of the true aggregates of their spacings an increment of movement equal to said first distance but falsely indicated as a half value reading by said scale, recording said increment of movement by placing a signal in relation to said scale in a way to enable said increment to be discerned and made use of without reference to the graduations of said scale, relatively moving said indicator and scale an extent determined by reference to said signal without reference to said graduations thereby without mental computation to convert a falsely denominated reading of said increment on said scale to a truly denominated reading thereof, placing said two mark-sensing elements in measuring accord with a second distance separating two different marks each in a different one of said pairs, and relatively moving said indicator and scale an extent equal to the difference between said first and second distances, whereupon there is indicated on said scale by said indicator the true spacing of said loci said step of setting said elements in accord with said first distance and the corresponding shifting of the indicator being sequentially irrespective of said step of placing said elements in accord with said second distance and the corresponding relative moving of said indicator and scale.

6. The method of ascertaining without mental computation a dimension separating unmarked centers of two widths delimited by discernible marks serially related in two pairs of said marks separated by a space between said pairs, which includes the steps of, setting two mark-sensing elements in measuring accord with a first distance that separates two of said marks each in a different one of said pairs and that includes said space, spacing off forwardly with the aid of an index from the zero end of a scale of graduations that are falsely denominated as half values of the true aggregates of their spacings said first distance, spacing off on said scale with the aid of said index a duplicate of said first distance thereby in the ultimate reading of said dimension on said falsely denominated scale to avoid the halving of said space, setting said two mark sensing elements in measuring accord with a second distance that separates a different two marks each in a different one of said pairs and that includes said space, and spacing off on said scale with the aid of the same index the difference between said first and second distances, said step of setting said elements in accord with said first distance and the corresponding spacing off of said first distance being sequentially irrespective of said step of setting said elements in accord with said second distance and the corresponding spacing off of said difference between said distances.

7. A dimension finding instrument affording direct reading of distance between unmarked loci lying respectively in spaces between different pairs of serially spaced discernible marks, including in combination, an instrument frame fixedly presenting at least one work-meeting terminal, a member carried by said frame presenting at least one other work-meeting terminal, said member being movable relatively to said frame in a direction to space said terminals a work measure distance apart, a fastener settable to fix said member releasably to said frame in selective work measuring positions, mutually cooperative relatively movable measurement indicators, at least one of said indicators comprising a scale of spaced characters reading as dimensional values different from but proportional to the true aggregates of spacings of said characters, an elongate slide movable lengthwise both in relation to said frame and in relation to said movable member mechanically associated with one of said indicators in a manner to cause movement thereof relative to the other said indicator, and stop means cooperative with said slide and with said member for mechanically determining an extent of permissible relative movement therebetween including a check adjustably movable relatively to said slide to selective positions therealong, and a fastener settable to fix said check releasably in said selective positions.

8. A dimension finding instrument as defined in claim 7, in which the said indicators are carried respectively by the said frame and by the said slide.

9. A dimension finding instrument as defined in claim 7, in which the said indicators are carried respectively by the said member and by the said slide.

10. A dimension finding instrument as defined in claim 7, in which the said indicators are carried respectively by the said frame and by the said stop means.

11. A dimension finding instrument as defined in claim 7, in which one of the said indicators comprises a scale of graduations marked with indicia reading one-half the true distance between the graduations to which said indicia are respectively applied.

12. A dimension finding instrument as defined in claim 7, in which one of the said indicators comprises a scale of graduations carried by the said frame.

13. A dimension finding instrument as defined in claim 7, in which one of the said indicators comprises a scale of graduations carried by the said slide.

14. A dimension finding instrument as defined in claim 7, in which one of the said indicators comprises a scale of graduations carried by the said slide, and the other of said indicators comprises an index carried by the said member.

15. A dimension finding instrument as defined in claim 7, in which one of the said indicators comprises a scale of graduations carried by the said slide, and the other of said indicators comprises an index carried by the said frame.

References Cited in the file of this patent

UNITED STATES PATENTS

| | | |
|---|---|---|
| 514,685 | Reber | Feb. 13, 1894 |
| 844,554 | Des Jardins | Feb. 19, 1907 |
| 1,153,785 | Helin | Sept. 14, 1915 |
| 1,526,305 | Neumaier | Feb. 10, 1925 |
| 1,650,704 | Gaa | Nov. 29, 1927 |
| 1,672,491 | Horak | June 5, 1928 |
| 1,888,416 | Williams | Nov. 22, 1932 |
| 2,009,472 | Brauer | July 30, 1935 |
| 2,059,740 | Minchew | Nov. 3, 1936 |
| 2,388,582 | Sorenson | Nov. 6, 1945 |
| 2,452,544 | Brodie | Nov. 2, 1948 |

FOREIGN PATENTS

| | | |
|---|---|---|
| 196,282 | Great Britain | Jan. 10, 1924 |
| 456,037 | Germany | Feb. 15, 1928 |
| 287,002 | Great Britain | Mar. 15, 1928 |